United States Patent

[11] 3,610,655

[72] Inventors: Bela Barenyi, Stuttgart-Vaihingen; Karl Wilfert, Gerlingen-Waldstadt, both of Germany
[21] Appl. No.: 776,098
[22] Filed: Nov. 15, 1968
[45] Patented: Oct. 5, 1971
[73] Assignee: Daimler-Benz Aktiengesellschaft Stuttgart-Unterturkheim, Germany
[32] Priority: Nov. 15, 1967
[33] Germany
[31] P 16 30 388.1

[54] SUSPENSION OF A RIGID AXLE
10 Claims, 7 Drawing Figs.
[52] U.S. Cl. ..................... 280/112, 180/124
[51] Int. Cl. ..................... B60g 7/00
[50] Field of Search ..................... 280/124, 112

[56] References Cited
UNITED STATES PATENTS
| | | | |
|---|---|---|---|
| 3,006,429 | 10/1961 | Polhemus | 280/112 X |
| 3,420,543 | 1/1969 | Strifler | 280/124 X |
| 3,448,992 | 6/1969 | Wilfert | 280/112 |
| 3,246,718 | 4/1966 | Kozicki | 280/124 X |

FOREIGN PATENTS
| | | | |
|---|---|---|---|
| 1,471,948 | 1/1967 | France | 280/112 |

Primary Examiner—Philip Goodman
Attorney—Craig, Antonelli, Stewart & Hill

ABSTRACT: A suspension for a rigid axle, in particular, for a rear axle of a passenger motor vehicle by means of an axle carrier on which is pivotally supported the rigid axle provided with a cranked portion; the axle carrier is disposed in the vehicle center and is pivotally supported about an axis disposed in the vehicle longitudinal direction with is located below the wheel centers and inside of the wheel base.

INVENTORS
BELA BARENYI
KARL WILFERT

ATTORNEYS

SUSPENSION OF A RIGID AXLE

The present invention relates to a suspension of a rigid axle, especially of a rear axle of a passenger motor vehicle, by means of an axle bearer or axle carrier, at which the axle cranked or offset in the driving direction is pivotally supported parallel to the wheel axes—about an axis A—A—and which is pivotally supported in the vehicle center about an axis B—B disposed in the vehicle longitudinal direction.

Suspensions of rigid axles are known already in the prior art (German Pat. Nos. 893,757 and No. 888,217) in which axle bearers or axle carriers are provided that are arranged in the longitudinal center of the vehicle and which are pivotally secured about this axis. The rigid axle provided with a cranked portion is arranged at such an axle bearer or carrier in the same plane with the pivot axis of the axle bearer or carrier. This type of construction, very advantageous as such, which enables a positive inclined spring means for the wheels, entails however the disadvantage that it requires a relatively large amount of space. Especially with modern passenger motor vehicles in which for safety reasons only the passenger cell is constructed in a deformation-rigid manner whereas the rear and front areas are kept relatively deformation-soft for the absorption of deformation energy, such a type of suspension of the rigid axle cannot be used.

The present invention aims at eliminating this disadvantage and seeks to create a suspension of the aforementioned type which enables the positive inclined spring system with modern passenger motor vehicles. The present invention essentially consists in that the axis disposed in the vehicle longitudinal direction of the axle bearer or carrier is arranged below the wheel centers and inside of the wheel base. By this special construction of the axle bearer or carrier, a sufficient space is created, on the one hand, in order to be able to accommodate the differential of the motor vehicle, and, on the other, only the area of the motor vehicle corresponding to the wheel base has to be kept rigid because the axle bearer or carrier is arranged inside of the wheel base.

In a structurally simple manner, the rear bearing support of the axle bearer or carrier, disposed in front of the wheel axes, may be supported by way of struts or braces at the rear main cross bearer of the framework of the vehicle.

Advantageously, the struts or braces may be constructed as triangular struts or supports.

According to a further feature and construction of the present invention, the struts or supports of the rear bearing support may form a structural unit together with the springs or spring legs or similar support elements of the rigid axle. The structural unit can be secured readily detachably at the vehicle superstructure. In order to avoid the transmission of vibrations, the struts or supports which are provided preferably with a cross bridge, are elastically supported.

A structurally extraordinarily advantageous construction of the present invention in which the struts of the rear bearing support are far-reachingly relieved, is obtained if the forward bearing support of the axle bearer or carrier is constructed as conventional, combined tension, compression and radial bearing whereas a pure radial bearing serves as the rear bearing support.

Accordingly, it is an object of the present invention to provide a suspension for a rigid axle, especially in passenger motor vehicles which eliminates by simple means the aforementioned shortcomings and drawbacks encountered in the prior art.

Another object of the present invention resides in a rigid axle suspension which not only requires relatively little space but also enables the accommodation of the differential gear between the wheels of the vehicle.

A further object of the present invention resides in a suspension for a rigid rear axle of motor vehicles in which for purposes of increasing the passenger safety, only the passenger cell has to be constructed relatively rigid as regards deformation while the front and rear vehicle sections can be constructed relatively soft as regards deformation for purposes of absorbing deformation energy.

Still a further object of the present invention resides in an axle suspension of the type described above which is simple in construction, easy to install and is located only inside of the wheel base of the vehicle.

These and further objects, features, and advantages of the present invention will become more obvious from the following description when taken in connection with the accompanying drawing, which shows, for purposes of illustration only, several embodiments in accordance with the present invention, and wherein.

Figure 1:
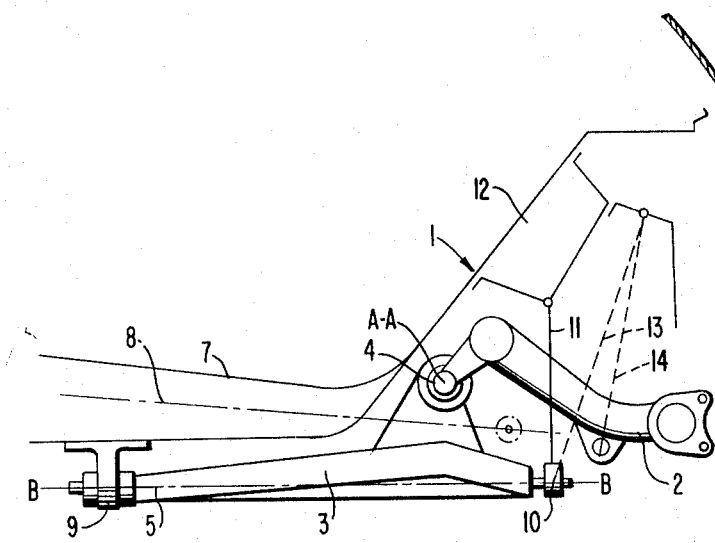
FIG. 1 is a somewhat schematic side elevational view of a suspension of a rigid axle in accordance with the present invention.
Figure 2:
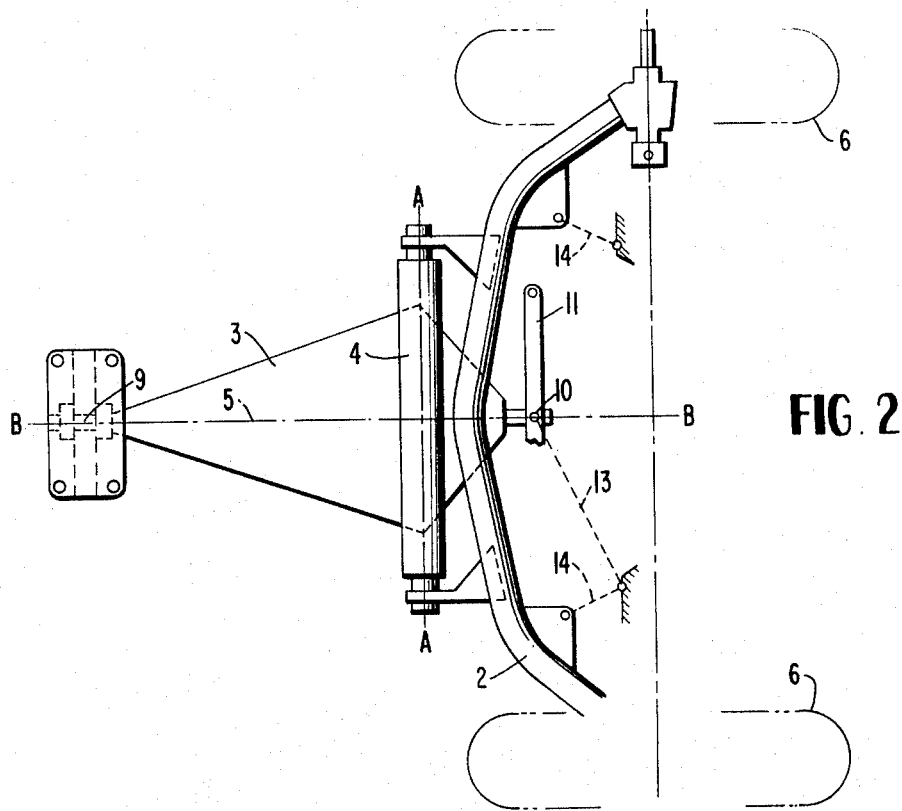
FIG. 2 is a top plan view on the suspension of FIG. 1.

Referring now to the drawing wherein like reference numerals are used throughout the various views to designate like parts, and more particularly to FIGS. 1 and 2, these two figures illustrate schematically a suspension of a rigid rear axle 2 for a passenger motor vehicle generally designated by reference numeral 1, of which only a part is shown. The rigid axle 2 is cranked in the driving direction of the motor vehicle (FIG. 2) and is pivotally supported at an axle carrier or bearer 3 about an axis 4 or A—A extending parallelly to the wheel axes. The axle bearer or carrier 3 is pivotally secured at the superstructure of the motor vehicle 1 about an axis 5 or B—B, disposed in the driving direction and extending perpendicularly to the axis 4 or A—A. The axis 5 of the axle bearer or carrier 3 is disposed below the center of the wheels 6 and is arranged inside of the wheel base of the motor vehicle 1. As a result thereof, a sufficient space is created within the area of the wheel centers in which the differential has to be conventionally accommodated. As indicated in FIG. 1, a cardan shaft 8 indicated in dash and dot lines in the drawing which is guided in the tunnel 7, can extend unimpaired into the area between the wheels 6.

Since the axle bearer or carrier 3 is arranged inside of the wheel base, only this area of the motor vehicle has to be constructed torsion-rigid or deformation-rigid. As forward bearing 9 for the axle carrier 3 is provided in an extraordinarily advantageous manner. A combined tension-, pressure- and radial-bearing of any conventional construction and known per se in the prior art is provided so that only forces in the radial direction have to be absorbed by the rear bearing 10. In a structurally simple manner, as indicated in FIG. 1, the rear bearing 10 which is otherwise a conventional radial bearing, known per se can be supported directly at the main cross bearer 12 (FIG. 1) of the motor vehicle superstructure by way of struts or supports 11. However, it may also be advantageous if struts 13, or supports indicated in dash line in FIGS. 1 and 2, of the rear bearing 10 are combined into a structural unit with the springs 14 or the spring legs or other support elements of the rigid axle 2 and are secured at the superstructure as is illustrated in FIGS. 1 and 2.

Figure 3:
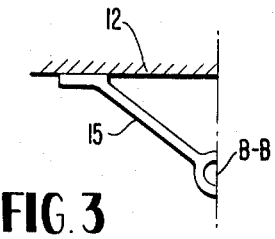
FIG. 3 and 3a are schematic elevational views of one-half each of two slightly different embodiments of symmetrically constructed rear bearing supports in accordance with the present invention.
Figure 3A:
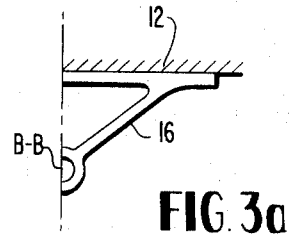

Triangular struts or support members 15 and 16 are illustrated in FIGS. 3 and 3a which serve for the direct support of the rear bearing 10 of the axle bearer or carrier 3 at the main cross bearer 12 of the motor vehicle superstructure. The triangular strut or support member 16 provided with a cross bridge is advantageous for an elastic mounting at the cross bearer 12.

Figure 4:
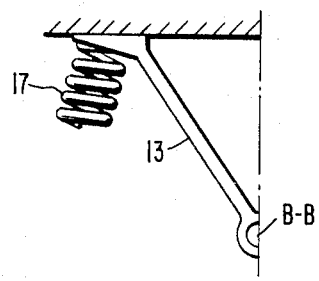
FIGS. 4 and 4a are schematic elevational views of one-half each of two further modified embodiments of symmetrically constructed supports of the rear bearing support.
Figure 4A:
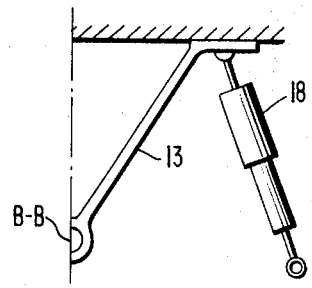
Figure 5:
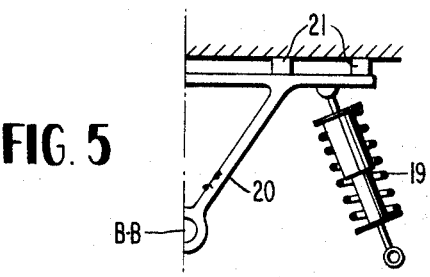
FIG. 5 is a schematic elevational view of one-half of a still further modified embodiment of a schematically constructed rear bearing support in accordance with the present invention.

As illustrated in FIGS. 4 and 4a, the struts 13 combined with the support elements may also be constructed as triangular struts. For example, they may be combined into a structural unit with a spring 17 or with a hydraulic spring leg 18 or with a shock absorber whereby the structural unit is advantageously secured at the superstructure in a readily detachable manner. As shown in FIG. 5, also a combined spring-shock-absorber system 19 may be combined with such a triangular strut 20 into a structural unit. In an extraordinarily advantageous manner, the triangular strut 20 provided with a cross bridge is supported in this embodiment by means of elastic blocks 21 at the superstructure of the motor vehicle which is advantageous in particular as regards vibrations.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A suspension for a rigid rear axle of a vehicle comprising: axle carrier means, the rigid rear axle being provided with a portion cranked in the longitudinal direction of the vehicle so that the central portion thereof is located forwardly of the end portions, means for pivotally supporting the rigid rear axle at the axle carrier means about an axis extending substantially parallel to axes of rear wheels and substantially perpendicular to the longitudinal direction of the vehicle, the axle carrier means being rotatably mounted about an axis located substantially in the longitudinal direction of the vehicle by forward and rear bearing support means and is arranged below the axes of the rear wheels, and the rear bearing support means being located forward of the rear wheel axes and supported at the vehicle superstructure by strutlike support means.

2. A suspension according to claim 1, wherein the vehicle superstructure includes a main rear cross bearer, and the strutlike support means are constructed as triangular strutlike members for supporting the rear bearing support means at the main rear cross bearer.

3. A suspension according to claim 1, wherein the forward bearing support means is constructed as combined tension-, compression- and radial-bearing support whereas the rear bearing support means serves as pure radial bearing means.

4. A suspension according to claim 1, wherein the strutlike support means of the rear-bearing support means form a structural unit with support elements of the rigid rear axle.

5. A suspension according to claim 4, wherein said support elements are spring means.

6. A suspension according to claim 4, wherein said support elements are spring leg means.

7. A suspension according to claim 4, wherein the structural unit is secured readily detachably at the vehicle superstructure.

8. A suspension according to claim 7, wherein the strutlike support means are provided with cross bridge means.

9. A suspension according to claim 1, wherein the strutlike support means are elastically supported.

10. A suspension according to claim 9, wherein the strutlike support means are provided with crossbridge means.